S. J. M. BEAR.
TELEGRAPHIC CIRCUIT.
No. 192,856.  Patented July 10, 1877.
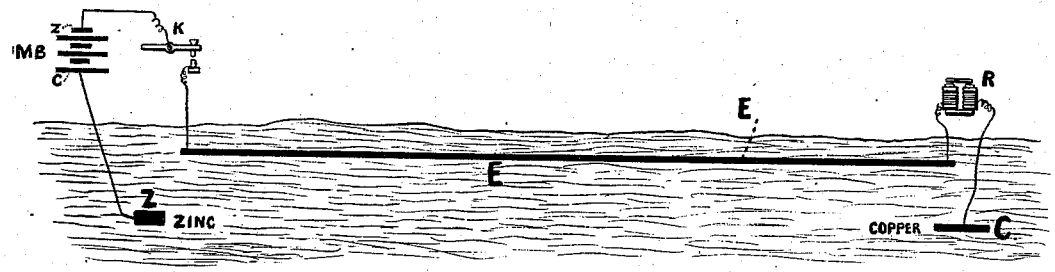

UNITED STATES PATENT OFFICE.

SIMEON J. M. BEAR, OF MITCHELL, IOWA.

IMPROVEMENT IN TELEGRAPHIC CIRCUITS.

Specification forming part of Letters Patent No. 192,856, dated July 10, 1877; application filed October 6, 1875.

*To all whom it may concern:*

Be it known that I, SIMEON J. M. BEAR, of Mitchell, in the county of Mitchell and State of Iowa, have invented an Improvement in Telegraphic Circuits, of which the following is a specification:

This invention is made for employing a non-insulated conductor, such as a gas-pipe or wire laid in the earth or in water, for conveying the electric pulsations from one station to another without the use of any return-circuit connection except that afforded by the earth itself. This improvement I designate the "terraqueous telegraph."

In the annexed diagram these circuit-connections are represented.

The main battery M B is provided with a metallic connection passing from the zinc or negative pole through the key K to the wire, pipe, railway-bar, or other continuous metallic connection, E, to the distant station, where the relay or receiving instrument R is connected in such metallic circuit, and also to a copper plate, $c$, that is buried in the earth. The copper pole of the main battery M B is also connected to the earth by a zinc plate, either naked, immersed in acid, or a solution of sulphate of zinc in a porous cup, and these are buried in the earth or immersed in water upon the earth.

The wire, pipe, or other non-insulated metallic connection, E, should be of zinc or coated with zinc, or of the same polarity as the zinc, in order that the whole of the electric current may not return from the main battery directly through the earth and through E to the battery, but a portion will pass to the copper element $c$ at the distant station, in consequence of the electric repulsion of the conductor E, and the resistance offered in passing from the buried zinc plate $z$ to the negative pole of the battery; hence sufficient of the current will pass to and return from the buried copper plate $c$ at the distant station to record the message in the receiving-instrument R.

By reversing the connections to the main battery and using a copper wire at E, sulphate of copper or a copper plate at $z$, and a zinc plate at $c$ at the distant station, the electric current will flow in the opposite direction, as the currents from like metals repel and flow to the metal of opposite polarity at the distant station.

I claim as my invention—

A telegraphic circuit composed of a main battery connected to the earth, a non-insulated conductor to the distant station, of metal of the same polarity as the pole of the battery to which it is connected, and a plate buried at the distant station of opposite polarity, substantially as set forth.

Signed by me this 7th day of May, 1875.

S. J. M. BEAR.

Witnesses:
    D. LINDSLEY,
    F. VAN HOOSER.